US009091786B2

(12) United States Patent
Yilmaz

(10) Patent No.: US 9,091,786 B2
(45) Date of Patent: Jul. 28, 2015

(54) IMAGE BASED EFFECTIVE MEDIUM MODELING OF THE NEAR SURFACE EARTH FORMATION

(76) Inventor: Oz Yilmaz, Istanbul (TR)

( * ) Notice: Subject to any disclaimer, the term of this patent is extended or adjusted under 35 U.S.C. 154(b) by 648 days.

(21) Appl. No.: 13/275,306

(22) Filed: Oct. 17, 2011

(65) Prior Publication Data

US 2012/0106293 A1 May 3, 2012

Related U.S. Application Data

(60) Provisional application No. 61/393,742, filed on Oct. 15, 2010.

(51) Int. Cl.
*G01V 1/30* (2006.01)
*G01V 1/36* (2006.01)
*G01V 1/28* (2006.01)

(52) U.S. Cl.
CPC ............... *G01V 1/362* (2013.01); *G01V 1/282* (2013.01); *G01V 2210/53* (2013.01); *G01V 2210/66* (2013.01)

(58) Field of Classification Search
CPC ......... G01V 1/362; G01V 1/364; G01V 1/30; G01V 1/282; G01V 99/005; G01V 2210/66; G01V 2210/53
USPC ............................................... 367/38, 54, 73
See application file for complete search history.

(56) References Cited

U.S. PATENT DOCUMENTS

| 5,073,876 | A | * | 12/1991 | Propes | 367/54 |
| 5,544,126 | A | * | 8/1996 | Berryhill | 367/52 |
| 2004/0073370 | A1 | * | 4/2004 | Dasgupta et al. | 702/6 |
| 2005/0256648 | A1 | * | 11/2005 | West | 702/16 |
| 2008/0294393 | A1 | * | 11/2008 | Laake et al. | 703/1 |
| 2010/0114495 | A1 | * | 5/2010 | Al-Saleh | 702/17 |

OTHER PUBLICATIONS

Zhu et al., "First-Arrival Tomography for Near-Surface Model building", EAGE 63rd Conference & Technical Exhibition—Amsterdam, The Netherlands, Jun. 11-15, 2001.*
Marsden, D., "Static Corrections—A Review, Part 1 ," The Leading Edge, Jan. 1993, vol. 12(1): pp. 43-49.*

* cited by examiner

*Primary Examiner* — Ian J Lobo
(74) *Attorney, Agent, or Firm* — Conley Rose, P.C.

(57) ABSTRACT

This disclosure presents a method that utilizes the seismic image of the near-surface formation to estimate an effective velocity field equivalent to the unknown true velocity field of the soil column, such that the statics shifts derived from the effective velocity field are essentially the same as the statics shifts that would have been computed using the unknown true velocity field. The effective velocity field derived statics shifts can be used to correct distortions caused by the near-surface formation and restore the sesimic image of the subsurface formation.

5 Claims, 7 Drawing Sheets

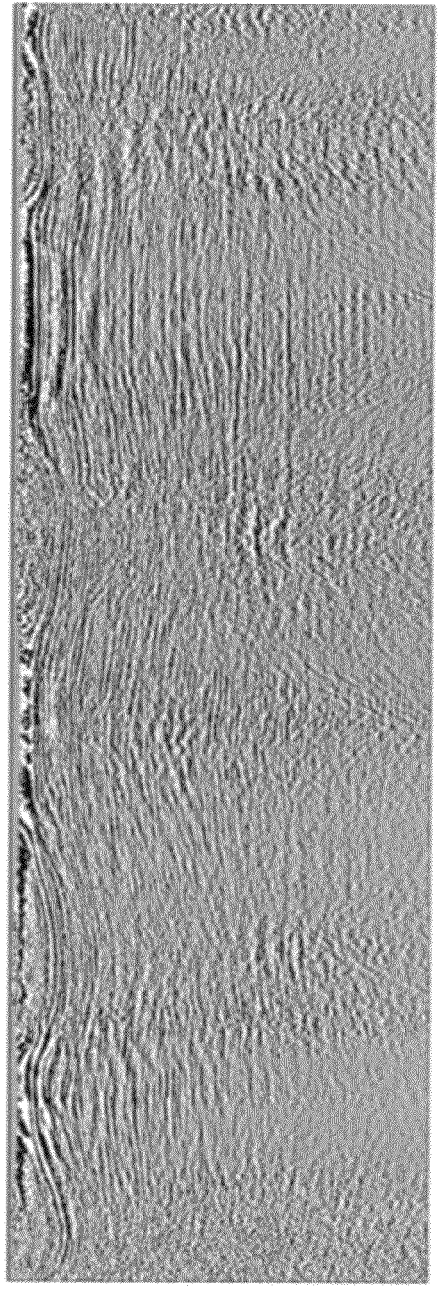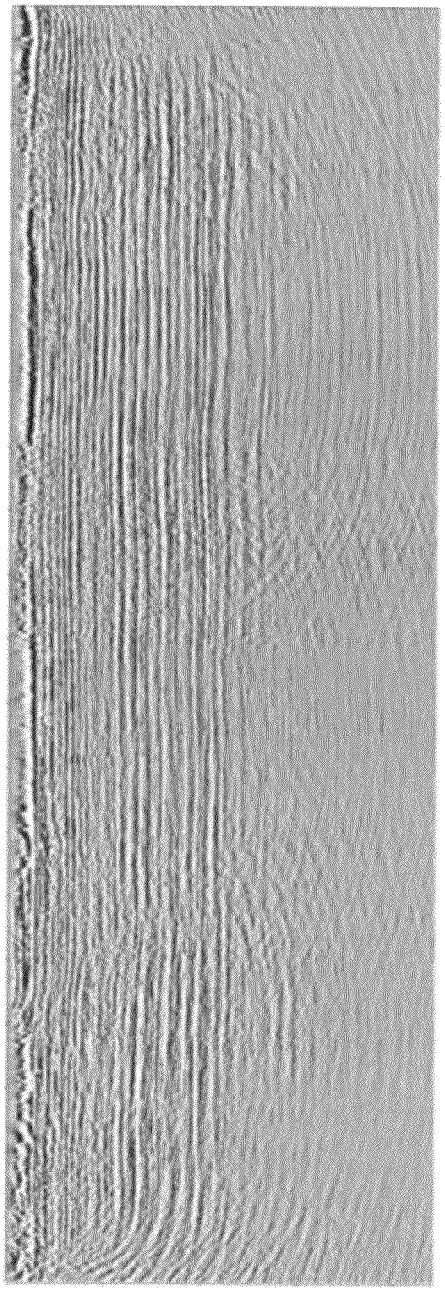
Fig. 4
Fig. 5

IMAGE BASED EFFECTIVE MEDIUM MODELING OF THE NEAR SURFACE EARTH FORMATION

CROSS-REFERENCE TO RELATED APPLICATION

This application claims priority to U.S. Provisional Application Ser. No. 61/393,742 filed Oct. 15, 2010, entitled "Image-Based Effective-Medium Modeling of the Near-Surface Earth Formation, and Method For Correcting The Subsurface Earth Formation Image Using Same."

STATEMENT REGARDING FEDERALLY SPONSORED RESEARCH OR DEVELOPMENT

Not applicable.

BACKGROUND

This disclosure relates to land seismic exploration for oil and gas, and seismic imaging of near-surface and subsurface layers. Conventional seismic methods for exploring subterranean strata beneath the Earth's surface involve generating a seismic wave and measuring the response. The seismic wave may be simple or complex and may be generated at various locations. The response is detected by a series of receivers. Various methods, techniques, and equipment for generating a seismic wave and recording the response are known in the industry and to one having ordinary skill in the art.

The near-surface earth formation usually is composed of a soil column with low-velocity clastics, such as clay, silt and sand with fine- to coarse-grained texture. The near-surface earth formation can be layered or severely heterogeneous with vertical and lateral velocity variations. Moreover, the thickness of the near-surface formation often varies within the seismic survey area. The term "near-surface earth formation" has an understood meaning in the field of land seismic exploration for oil and gas and would be understood by one having ordinary skill in the art.

In land seismic exploration for oil and gas, the near-surface earth formation distorts the seismic image of the subsurface earth formation, or that portion of the earth formation directly below the near-surface earth formation. As such, accurate mapping of the geometry of hydrocarbon reservoirs requires correcting for the deleterious effect of the near-surface formation on the imaged geometry of the subsurface formation layers.

Correction of near-surface distortions usually is performed by the application of vertical (static) time shifts to the recorded data traces. Statics corrections, however, require an accurate model of the near-surface formation represented by a velocity field associated with the near-surface soil column.

In the seismic industry, there are several classes of methods to estimate a model for the near-surface formation, including downhole seismic measurements, shallow seismic surveys, traveltime tomography inversion, and waveform tomography inversion.

A first method for estimating a model for the near-surface formation includes downhole seismic measurements. Downhole seismic measurements are time consuming and prohibitively costly, and suffer from adverse borehole conditions. Additionally, the downhole seismic measurement method provides the velocity information for the near-surface only at the survey points within the project or analysis area.

A second method for estimating a model for the near-surface formation includes shallow seismic surveys. Shallow seismic surveys also are time consuming and, similar to the downhole seismic measurement method, provide the velocity information for the near-surface only at the survey points.

A third category of method for estimating a model for the near-surface formation includes tomographic inversion. Tomographic inversion of first-arrival times requires picking or choosing the first-arrival times from recorded seismic data. This is an extremely tedious and time-consuming effort, prone to serious picking errors, especially with data acquired by vibroseis source. The additional time required for the quality control of the first-break picks and numerically intensive computation required for the tomographic inversion make this method rather expensive for large 3-D land seismic projects. Tomographic inversion of early-arrival waveforms requires accurate estimate of the source waveform, and involves extremely intensive computation which can take several weeks, if not months, for a 3-D land seismic project of moderate size (for example, a few hundred square kilometers). Additionally, for this method to yield acceptable results, the wavefield modeling required for the inversion would have to be performed using the elastic wave equation. Finally, traveltime and waveform tomography methods both suffer from the velocity-depth ambiguity that is transcribed to non-uniqueness of the estimated model.

The embodiments disclosed herein overcome the aforementioned limitations of the prior art.

BRIEF DESCRIPTION OF THE DRAWINGS

For a detailed description of exemplary embodiments, reference will now be made to the accompanying drawings in which:

FIG. 4 shows a subsurface formation seismic image in the form of a stacked section without near-surface corrections, including distorted geometry of the subsurface reflections caused by the near-surface effects described by the model of FIG. 1;

FIG. 5 shows a subsurface formation seismic image in the form of a prestack time migrated section and including calculated statics shifts using the effective-medium model of FIG. 2 and in accordance with the principles disclosed herein.

DETAILED DESCRIPTION

Figure 1:
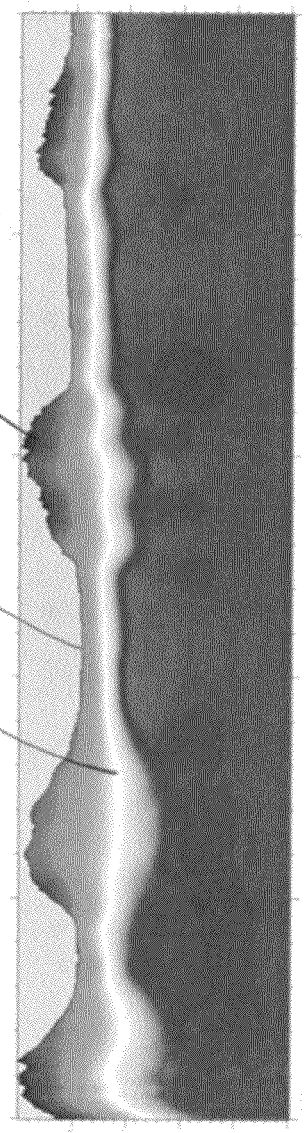
FIG. 1 shows a velocity-depth model of the near-surface formation estimated using traveltime tomography.

In the drawings and description that follow, like parts are typically marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

This disclosure presents a method that utilizes the seismic image of the near-surface to estimate an effective velocity field equivalent to the unknown true velocity field of the soil column, such that the statics shifts derived from the effective velocity field are essentially the same as the statics shifts that would have been computed using the unknown true velocity field.

Referring to FIG. 1, the graph 100 shows a velocity-depth model of the near-surface formation along a seismic line more than 12 km in length with sand dunes. The model 100 was estimated by using traveltime tomography applied to the first-arrival times picked from the recorded data traces. A top, dark layer shading 104 under a curve 102 represents low velocities associated with the dry sand caps over the dunes. The lighter colored shading is an intermediate layer 106 representing the relatively high-velocity wet sands at the root of the dunes.

Figure 2:
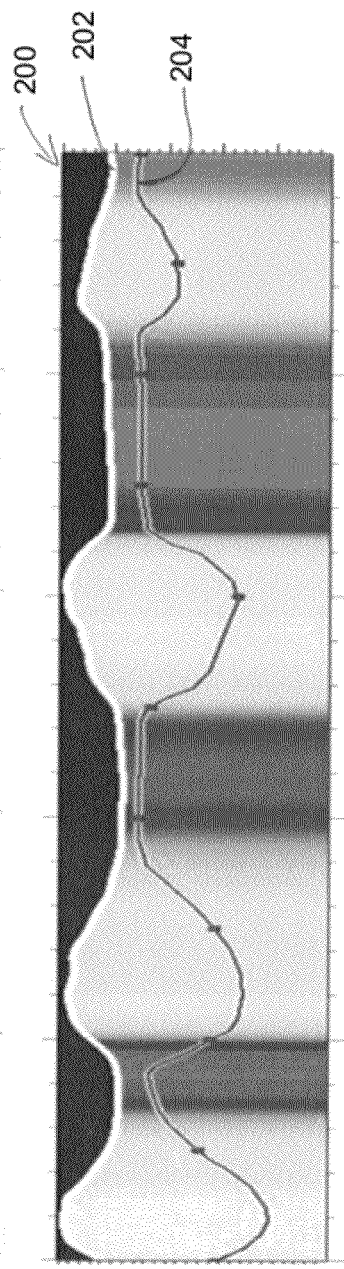
FIG. 2 shows an effective-medium model of the near-surface formation in accordance with the principles disclosed herein.

Referring now to FIG. 2, a graph or model 200 is in accordance with the principles disclosed herein. The model 200 shows the effective-medium model estimated by the method embodiments disclosed herein, which include a method based on the near-surface image. The model 200 includes an upper curve 202 and a curve 204 of the statics shifts.

Figure 3:
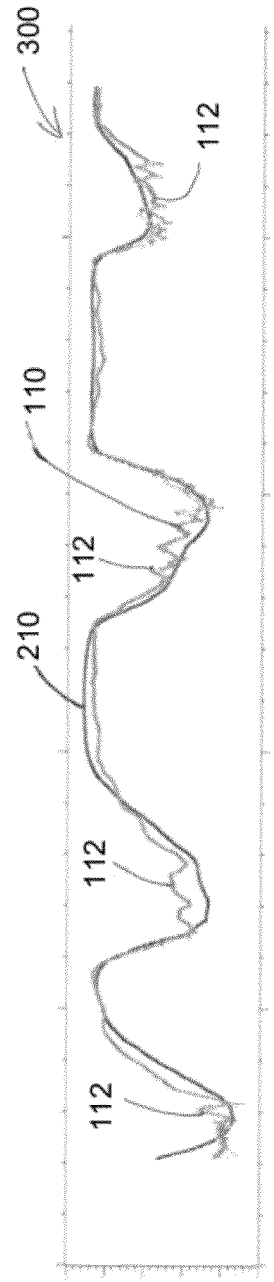
FIG. 3 shows a comparison between a curve representing the statics time shifts calculated from the tomographic model of FIG. 1 with a curve representing the statics time shifts calculated from the effective-medium model of FIG. 2.

The model 100 using traveltime tomography and the model 200 using the present method embodiments both yield substantially the same statics time shifts as shown in FIG. 3. Referring now to FIG. 3, a curve 210 represents the statics time shifts calculated from the effective-medium model 200 of FIG. 2, and a curve 110 represents the statics time shifts calculated from the tomographic model 100 of FIG. 1. As shown in FIG. 3, the short-wavelength variations 112 in the curve 110 are not reliable. The short-wavelength (residual) statics shifts may have to be calculated by a subsequent step in the analysis.

Now, with reference to FIGS. 4 and 5, an image 350 represents a subsurface formation seismic image in the form of a stacked section without near-surface corrections. The image 350 includes distorted geometry of the subsurface reflections caused by the near-surface effects described by the model 100 of FIG. 1. FIG. 5 includes an image 360 that represents a subsurface formation seismic image in the form of a prestack time migrated section. By calculating the statics shifts using the effective-medium model 200 of FIG. 2 and in accordance with the principles disclosed herein and explained more fully below, and applying them to the data traces, the geometry of the subsurface reflectors are restored as illustrated in FIG. 5.

Figure 6:
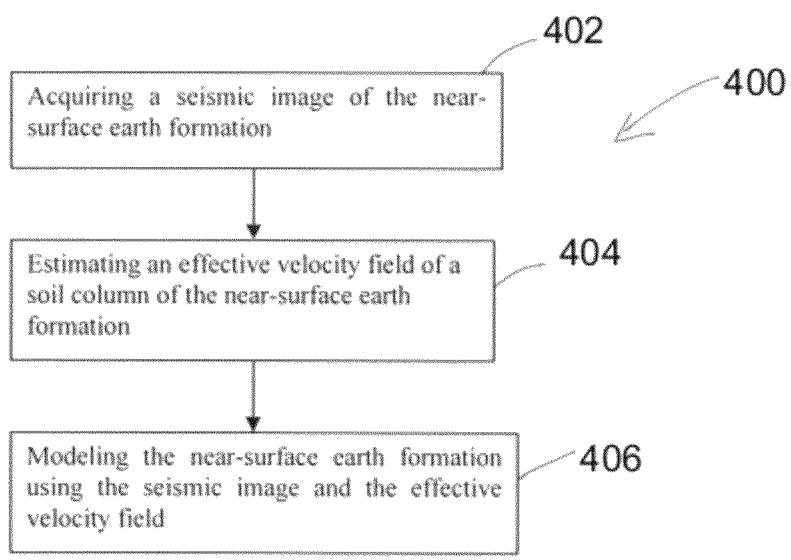
FIGS. 6-10 show embodiments of a method for modeling a near-surface formation in accordance with the principles disclosed herein.
Figure 7:
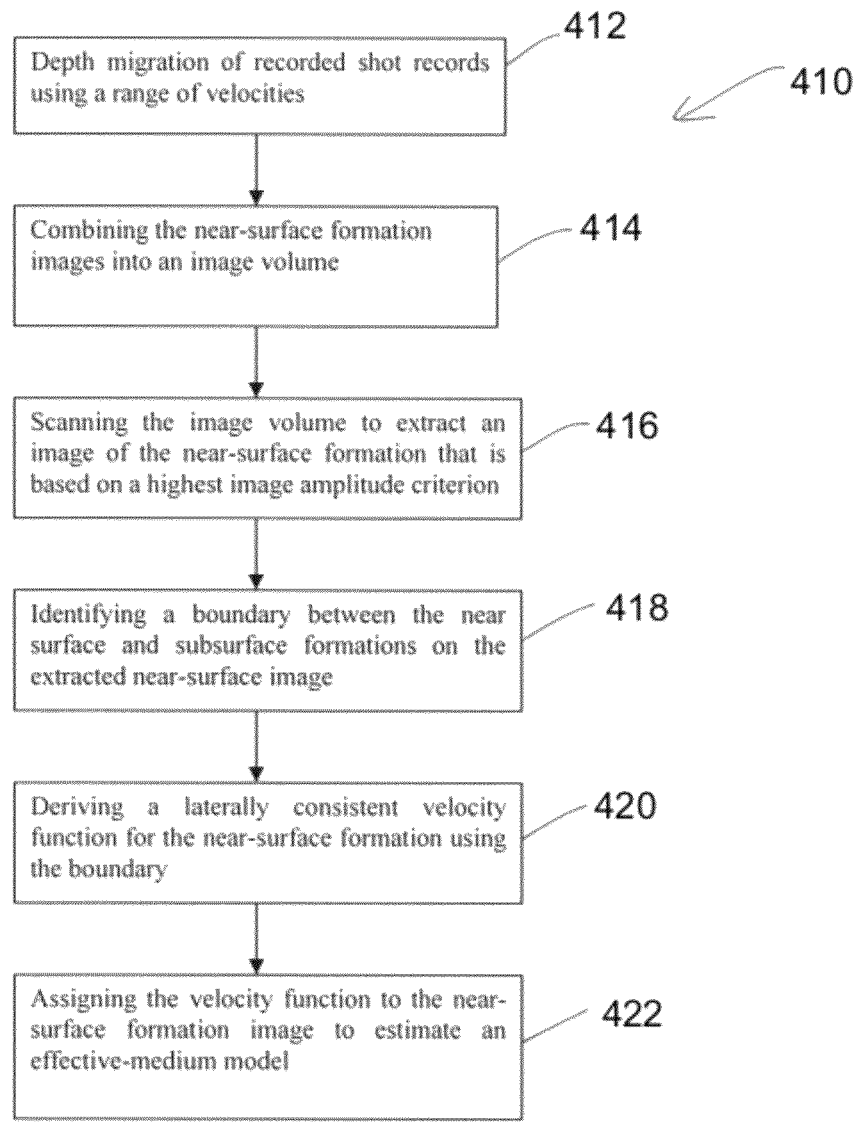

Referring next to FIG. 6, an embodiment of a method 400 for estimating a model for a near-surface earth formation includes acquiring a seismic image of the near-surface earth formation at 402, estimating an effective velocity field of a soil column of the near-surface earth formation at 404, and modeling the near-surface earth formation using the seismic image and the estimated effective velocity field at 406. In some embodiments, the estimation of the effective velocity field of the near-surface earth formation, or the method for image-based effective-medium modeling of the near-surface formation, at 410, may further include depth migration of the recorded shot records using a range of velocities, at 412 as shown in FIG. 7. The migration algorithm used may vary. In an exemplary embodiment, the Kirchhoff algorithm or the Kirchhoff prestack depth migration algorithm is used. The Kirchhoff algorithm includes both near-field and far-field terms, and may be preferred so as to accommodate irregular spatial sampling of the recorded data. In further embodiments, the migration is performed from topography, and not from a flat datum.

In still further embodiments, the near-surface formation images are combined in the form of an image volume, at 414, and are then scanned to extract an image of the near-surface formation that is based on a highest image amplitude criterion, at 416. Also, a boundary between the near-surface and subsurface formations or regions is identified on the extracted near-surface image, at 418, and used to derive a laterally consistent velocity function for the near-surface formation, at 420. The velocity function is then assigned to the near-surface region to estimate the effective-medium model 200 shown in FIG. 2, at 422. The effective-medium model 200 is consistent with the concept of statics corrections, which are based on a vertical-raypath assumption. The true velocity-depth model for the near-surface formation need not be known; instead, the embodiments herein advantageously and more simply estimate the effective-medium model that would yield the same statics shifts that would have been calculated from the unknown true model.

Figure 8:
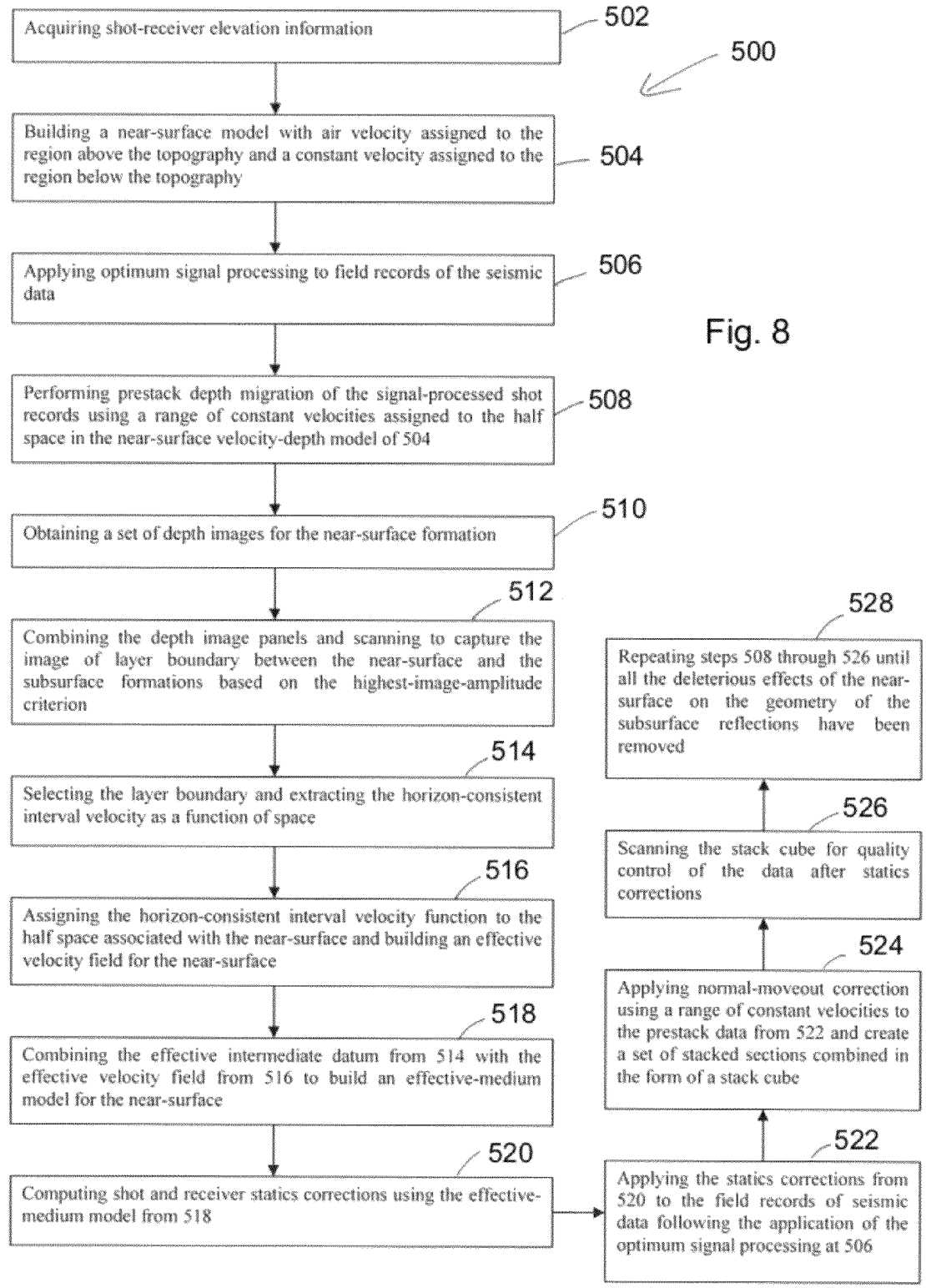

An embodiment of a method 500 for image-based, effective-medium near-surface modeling, as applied to 2-D and 3-D seismic data, is illustrated with reference to FIG. 8. First, the method begins by acquiring shot-receiver elevation information, at 502. Next, a near-surface model is built or created with air velocity assigned to the region above the topography and a constant velocity assigned to the region below the topography (i.e., a velocity-depth model), at 504. In some embodiments, the constant velocity for the region below the topography is taken as an average value for the upper near-surface that usually comprises low velocity clastics. Then, the method 500 includes applying optimum signal processing to field records of the seismic data, at 506. In some embodiments, signal processing application may include spherical divergence correction. In further embodiments, signal processing may include a combination of time-variant spectral whitening and multichannel f-x dip filtering to attenuate surface waves and guided waves. In still further embodiments, signal processing may include predictive deconvolution to condition the spectrum to a Gaussian shape within the recoverable signal passband.

The method 500 further includes, at 508, performing prestack depth migration of the signal-processed shot or field records using a range of constant velocities assigned to the half space in the near-surface velocity-depth model as referenced at 504. Then, the method 500 includes obtaining a set of depth images for the near-surface formation, at 510. The depth image panels can be combined and scanned to capture the image of layer boundary between the near-surface and the subsurface formations based on the highest-image-amplitude criterion, as seen at 512. The method includes selecting the layer boundary and extracting the horizon-consistent interval velocity as a function of space, at 514. In some embodiments, the layer boundary is called the effective intermediate datum. The method then includes assigning the horizon-consistent interval velocity function to the half space associated with the near-surface, and building an effective velocity field for the near-surface, at 516. Next, the effective intermediate datum from 514 is combined with the effective velocity field from 516 to build an effective-medium model for the near-surface formation, at 518.

The method further includes computing shot and receiver statics corrections using the effective-medium model from 518, at 520. In some embodiments, this involves a two-step process: (a) moving the shots and receivers from the surface topography to the effective intermediate datum using the effective velocity field, and (b) moving back up to the surface topography using a replacement velocity measured from the shot records as an average value of the subsurface region just below the effective intermediate datum. Then, at 522, the method 500 includes applying the statics corrections from 520 to the field records of seismic data following the application of the optimum signal processing at 506. Further, the method includes applying normal-moveout (NMO) correction using a range of constant velocities to the prestack data from 522 and creating a set of stacked sections combined in the form of a stack cube, at 524. The stack cube can be scanned for quality control of the data after statics corrections, at 526. In some embodiments, the steps 508 through 526 are repeated until all the deleterious effects of the near-surface on the geometry of the subsurface reflections have been removed, at 528. In some embodiments, removal of the deleterious effects of the near-surface formation on the geometry of the subsurface reflections requires one to three iterations.

After the removal of the near-surface effects on the geometry of the subsurface reflections using the image-based effective-medium method described in this disclosure, the operator or geophysicist continues with the analysis of the seismic data to image the subsurface either in time by way of estimating rms velocities and prestack time migration or in depth by way of estimating interval velocities and prestack depth migration.

Figure 9:
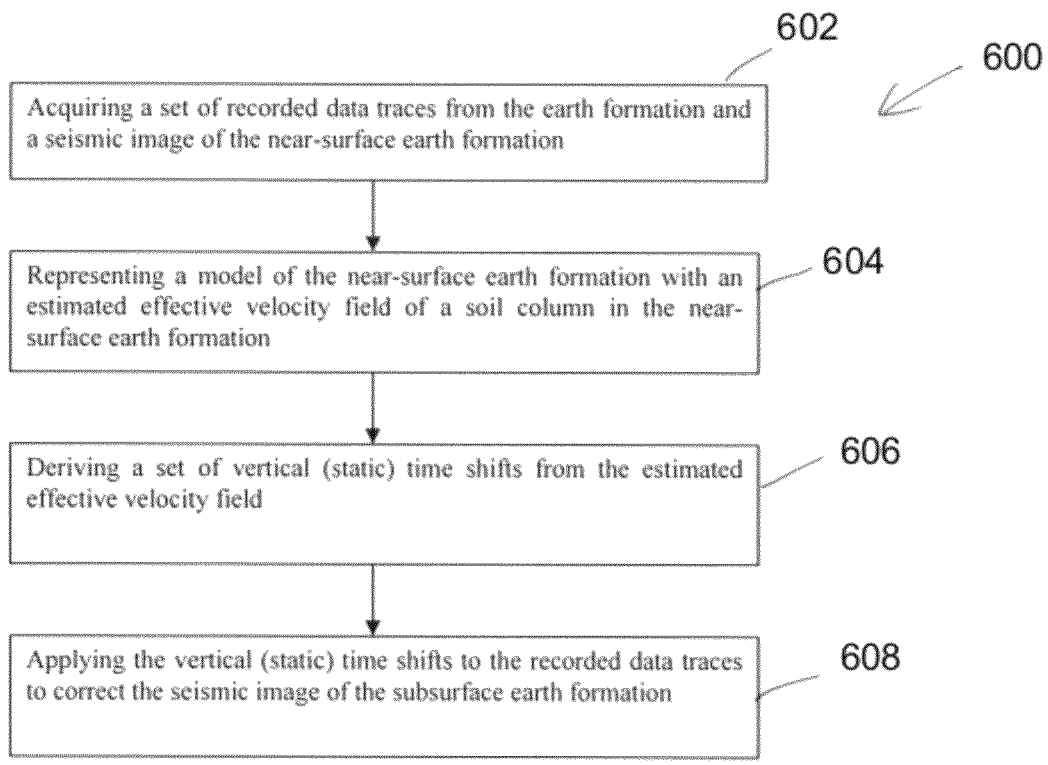
Figure 10:
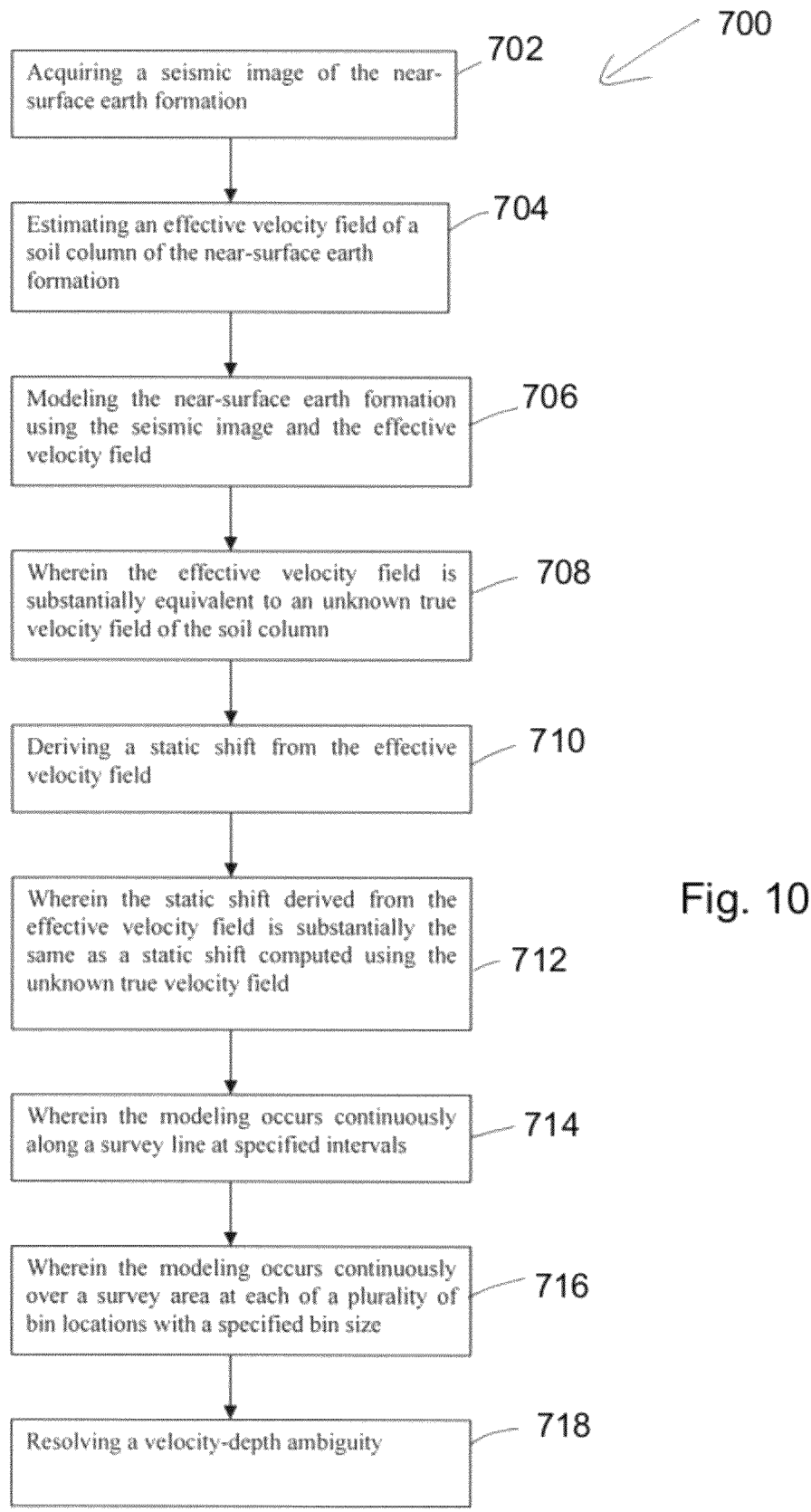

In still further embodiments, a method 600 for estimating a model for a near-surface earth formation and then using the near-surface model to correct for distortions in a seismic image of the subsurface formation is shown in FIG. 9. The method 600 includes acquiring a set of recorded data traces from the earth formation and a seismic image of the near-surface earth formation at 602. Next, the method 600 includes representing a model of the near-surface earth formation with an estimated velocity field of a soil column in the near-surface earth formation, at 604, and in accordance with disclosure elsewhere herein. Then, the method 600 includes deriving a set of vertical or static time shifts from the estimated effective velocity field, at 606, and in accordance with disclosure elsewhere herein. Finally, the method 600 includes applying the vertical or static time shifts to the recorded data traces to correct the distortions caused by the near-surface formation and restore the seismic image of the subsurface earth formation at 608.

In further embodiments, a method 700 may include steps 702 through 706 similar to steps 402 through 406 of the method 400. Further, the method 700 may include an effective velocity field that is substantially equivalent to an unknown true velocity field of the soil column at 708. The method may include deriving a static shift from the effective velocity field at 710, and wherein the static shift derived from the effective velocity field is substantially the same as a static shift computed using the unknown true velocity field at 712. The disclosed embodiments produce a model for the near-surface formation, not just at sparse points along the survey line or within the survey area but continuously along the survey line at specified intervals at 714 (such as receiver or common-midpoint spacing) or over the survey area at each bin location with a specified bin size at 716. The method does not require picking first-arrival times, nor does it require an estimate of the source waveform. Moreover, the method is extremely efficient and time saving. For a given 2-D seismic line, for instance, to estimate a model for the near-surface may take three weeks to complete using the waveform tomography, three days to complete using the traveltime tomography, but only three hours using embodiments of the method herein. Further, the method has a built-in mechanism to resolve the velocity-depth ambiguity at 718 and thus yields a model for the near-surface that can be used for calculating the statics shifts with confidence.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A method for modeling a near-surface earth formation comprising:
    acquiring seismic information;
    building a near-surface model with an assigned velocity to a region above the topography and an assigned velocity to a region below the topography;
    applying signal processing to the seismic information;
    performing a prestack depth migration of the signal-processed seismic information using a range of constant velocities assigned to the region below the topography;
    obtaining a set of depth images for the near-surface formation;
    combining the depth images and scanning the depth images to capture a layer boundary between the near-surface formation and a subsurface formation based on a highest image amplitude criterion;
    selecting the layer boundary;
    extracting a horizon-consistent interval velocity as a function of space; and
    assigning the horizon-consistent interval velocity function to the region below the topography and building an effective velocity field for the near-surface formation.

2. The method of claim 1 further comprising combining the layer boundary with the effective velocity field to build an effective-medium model for the near-surface formation.

3. The method of claim 2 further comprising computing statics corrections using the effective-medium model.

4. The method of claim 3 further comprising applying the statics corrections to the signal-processed seismic information.

5. The method of claim 4 further comprising:
    applying normal-moveout correction using a range of constant velocities to form a stack cube; and
    scanning the stack cube for quality control.

* * * * *